(12) United States Patent
Kim et al.

(10) Patent No.: US 12,455,902 B2
(45) Date of Patent: Oct. 28, 2025

(54) METHOD AND DEVICE FOR EXTRACTING FEATURE VALUE OF TIME SERIES DATA

(71) Applicant: RTM INC., Seoul (KR)

(72) Inventors: Sang Yeop Kim, Seoul (KR); Jin Woo Park, Seoul (KR); Tae Kyung Ha, Suwon-si (KR)

(73) Assignee: RTM INC., Seoul (KR)

( * ) Notice: Subject to any disclaimer, the term of this patent is extended or adjusted under 35 U.S.C. 154(b) by 58 days.

(21) Appl. No.: 18/248,042

(22) PCT Filed: Feb. 24, 2022

(86) PCT No.: PCT/KR2022/002734
§ 371 (c)(1),
(2) Date: Apr. 12, 2023

(87) PCT Pub. No.: WO2022/182176
PCT Pub. Date: Sep. 1, 2022

(65) Prior Publication Data
US 2023/0367793 A1 Nov. 16, 2023

(30) Foreign Application Priority Data
Feb. 26, 2021 (KR) .................. 10-2021-0026328

(51) Int. Cl.
*G06F 16/28* (2019.01)
*G06F 16/23* (2019.01)
*G06F 16/25* (2019.01)

(52) U.S. Cl.
CPC ........ *G06F 16/285* (2019.01); *G06F 16/2365* (2019.01); *G06F 16/254* (2019.01)

(58) Field of Classification Search
CPC ... G06F 16/285; G06F 16/2365; G06F 16/254
See application file for complete search history.

(56) References Cited

U.S. PATENT DOCUMENTS

| | | | |
|---|---|---|---|
| 9,245,235 B2 * | 1/2016 | Chen | G06F 17/16 |
| 10,911,468 B2 * | 2/2021 | Muddu | H05K 999/99 |
| 10,970,891 B2 * | 4/2021 | Garvey | G06Q 10/0631 |
| 11,080,127 B1 * | 8/2021 | Vincent | G06N 5/048 |
| 11,080,906 B2 * | 8/2021 | Garvey | G06T 11/206 |
| 11,275,357 B2 * | 3/2022 | Liu | G01D 9/005 |
| 11,277,425 B2 * | 3/2022 | Kulkarni | G06F 18/29 |
| 11,423,216 B2 * | 8/2022 | Miller | G06F 40/279 |

(Continued)

FOREIGN PATENT DOCUMENTS

| | | |
|---|---|---|
| JP | H10282963 A | 10/1998 |
| JP | 2016062258 A | 4/2016 |

(Continued)

*Primary Examiner* — Miranda Le
(74) *Attorney, Agent, or Firm* — Seed Intellectual Property Law Group LLP

(57) ABSTRACT

Provided are a method and a device for extracting a feature value of time series data, the method including receiving time series data, segmenting the time series data into one or more segments according to preset segment types, identifying a first feature group mapped to a segment type of a first segment among the one or more segments, and extracting a value of at least one item included in the first feature group from the first segment as a feature value.

20 Claims, 14 Drawing Sheets

(56) References Cited

U.S. PATENT DOCUMENTS

| | | | |
|---|---|---|---|
| 11,494,661 B2* | 11/2022 | Wu | G06N 3/088 |
| 11,880,750 B2* | 1/2024 | Ardel | G06N 20/00 |
| 2016/0076970 A1 | 3/2016 | Takahashi | |
| 2017/0104342 A1* | 4/2017 | EIBsat | H02J 7/35 |
| 2017/0177646 A1* | 6/2017 | Chen | H04L 67/12 |
| 2019/0179296 A1 | 6/2019 | Imamura et al. | |
| 2019/0286096 A1* | 9/2019 | Kawanoue | G05B 23/0254 |
| 2019/0391574 A1* | 12/2019 | Cheng | G06N 3/044 |
| 2020/0004616 A1* | 1/2020 | Natsumeda | G06N 5/02 |
| 2020/0019852 A1 | 1/2020 | Yoon et al. | |
| 2020/0220555 A1 | 7/2020 | Song et al. | |
| 2020/0292608 A1* | 9/2020 | Yan | G06N 3/044 |
| 2021/0191947 A1* | 6/2021 | Hariharan | G06F 16/24575 |

FOREIGN PATENT DOCUMENTS

| | | |
|---|---|---|
| JP | 2018073241 A | 5/2018 |
| KR | 20150082976 A | 7/2015 |
| KR | 101940029 B1 | 1/2019 |
| KR | 20190040346 A | 4/2019 |
| KR | 20200052424 A | 5/2020 |
| KR | 20200086548 A | 7/2020 |
| KR | 102294800 B1 | 8/2021 |

* cited by examiner

FIG. 3

| Segment type | Feature group |
|---|---|
| Constant type | Starting time point, ending time point, segment maintaining time |
| Spike type | Kurtosis information |
| Piecewise-constant type | Starting time point, ending time point, maximum value, minimum value |
| Steady-state type | Maximum value, minimum value, average, standard deviation, starting time point, ending time point |
| Up-ramp type<br>Down-ramp type | Slope, convexity, autocorrelation information, frequency, maximum value, minimum value, starting time point, ending time point |

METHOD AND DEVICE FOR EXTRACTING FEATURE VALUE OF TIME SERIES DATA

BACKGROUND

Technical Field

This disclosure relates a method and a device for extracting a feature value of time series data.

Description of the Related Art

Time series data may be defined as a set of a series of data collected for a predetermined period and sequentially determined. The time series data points are ordered in time and there exists a correlation between consecutive data points. Therefore, abnormal data included in the time series data may be detected based on an autocorrelation of the time series data or a correlation among a plurality of time series data. For example, abnormal data may be detected using Recurrent Neural Network (RNN) and Long short-term memory (LSTM) deep-learning technologies, or future time series data may be predicted based on past time series data.

BRIEF SUMMARY

The inventors have observed that managing sensor data is a challenge in high-tech fields due to the vast amount of time series data generated by a sensor during a process. Thus, prediction modeling may often extract features from original data and change the features into variables for use, rather than using the original data. However, the inventors have noted that it is challenging to extract suitable feature values of time series data in every process and to apply the extracted feature values in modeling. Further, a prediction performance may possibly be deteriorated due to a wrong selection of a feature value to be input in modeling. Therefore, the inventors have recognized a need for a method and a device for managing time series data efficiently and extracting feature values necessary for detecting an anomaly.

Accordingly, one or more embodiments of the present disclosure provide a method and a device for extracting a feature value of time series data, wherein time series data are segmented into one or more segments, and according to a feature group mapped to each segment, a feature value of an item included in the corresponding feature group is extracted.

The goals to be achieved by example embodiments of the present disclosure are not limited to the technical aspects described above, and other goals may be inferred from the following example embodiments.

According to a first example embodiment, there is provided a method for extracting a feature value of time series data, wherein the method may include receiving time series data, segmenting the time series data into one or more segments according to preset segment types, identifying a first feature group mapped to a first segment among the one or more segments, and extracting a feature value of an item included in the first feature group from the first segment.

According to a second example embodiment, there is also provided a device for extracting a feature value of time series data, the device including a memory configured to store at least one instruction, and a processor, wherein the processor, by executing the at least one instruction, is configured to receive time series data, segment the time series data into one or more segments according to preset segment types, identify a first feature group mapped to a first segment among the one or more segments, and extract a feature value of an item included in the first feature group from the first segment.

According to a third example embodiment, there is also provided a non-transitory computer-readable recording medium in which a program to execute a method for extracting a feature value of time series data in a computer is recorded, the method including receiving time series data, segmenting the time series data into one or more segments according to preset segment types, identifying a first feature group mapped to a first segment among the one or more segments, and extracting a feature value of an item included in the first feature group from the first segment.

Details of other example embodiments are included in the following detailed description and the accompanying drawings.

Technical Benefits

According to example embodiments, it is possible to accurately and easily detect abnormal time series data through extracted feature values using a method and a device for extracting a feature value of time series data according to the present disclosure which may extract different feature values according to a segment type.

Further, a method and a device for extracting a feature value of time series data according to the present disclosure provide an effect of improving an accuracy of segmentation by compressing time series data and then segmenting the time series data into segments.

Technical benefits of the present disclosure are not limited to those described above, and other benefits may be made apparent to those skilled in the art from the following description.

BRIEF DESCRIPTION OF THE SEVERAL VIEWS OF THE DRAWINGS

FIG. 3 provides a feature group which may be mapped to each segment type according to an example embodiment of the present disclosure.

DETAILED DESCRIPTION

Terms used in the example embodiments are selected, as much as possible, from general terms that are widely used at present while taking into consideration the functions obtained in accordance with the present disclosure, but these terms may be replaced by other terms based on intentions of those skilled in the art, customs, emergence of new technologies, or the like. Also, in a particular case, terms that are arbitrarily selected by the applicant of the present disclosure may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

In the entire specification, when an element is referred to as "including" or "comprising" another element, the element should not be understood as excluding other elements so long as there is no special conflicting description, and the element may include at least one other element.

The expression "at least one of A, B, and C" may include the following meanings: A alone; B alone; C alone; both A and B together; both A and C together; both B and C together; or all three of A, B, and C together.

Time series data described throughout the specification may be defined as a numerical progression of data arranged at a regular time interval. Thus, the time series data may also be defined as a set of values observed sequentially in time. Meanwhile, the time series data is dependent on time, and data generated at time t may be affected by data at time t−1. For example, the time series data may include temperatures, stock prices, exchange rates, and sea level observation data, thereby including sensor data which may be received from various sensors. Specifically, sensor data may be, but not be limited to, data received from a thickness sensor, a speed sensor, an acceleration sensor, a vibration sensor, a power sensor, a pressure sensor, a position sensor, a sensor for measuring plasma intensity, a temperature sensor, a pH sensor, a chemical composition sensor, and a chemical concentration sensor.

In the following description, example embodiments of the present disclosure will be described in detail with reference to the drawings so that those skilled in the art can easily carry out the present disclosure. However, the present disclosure may be implemented in various different forms but it is not limited to the exemplary embodiments described herein.

Hereinafter, example embodiments of the present disclosure will be described in detail with reference to the accompanying drawings.

Figure 1:
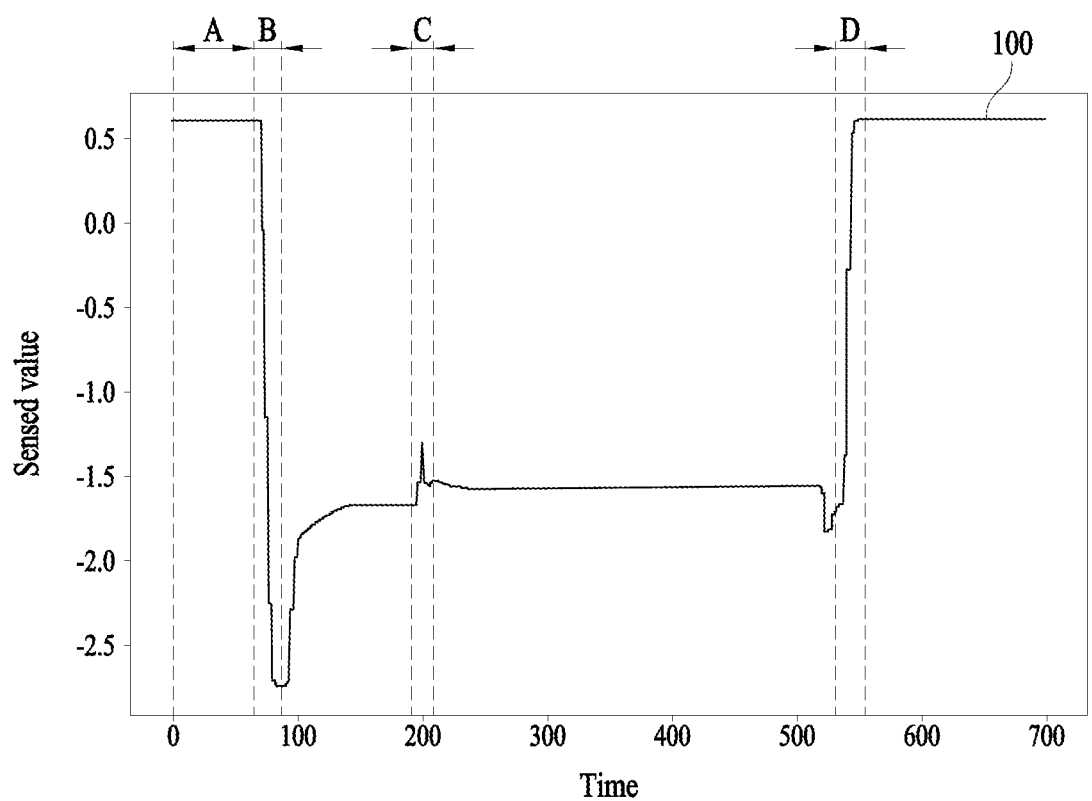
FIG. 1 illustrates time series data and segments included in the time series data according to example embodiments of the present disclosure.

FIG. 1 illustrates time series data and segments included in the time series data according to example embodiments of the present disclosure.

Time series data 100 according to an example embodiment of the present disclosure may be composed of a section A where a value remains constant, a section B where a value plunges, a spike section C, a section D where a value soars, and the like. Thus, if feature values of a predetermined item over all sections of the time series data are extracted without considering the feature of each section included in the time series data, it may not be easy to manage time series data only using the extracted results. For example, the time series data 100 of FIG. 1 may be a sensed value received from a pressure sensor during a specific process. Here, at an early stage of the process, a high pressure may be constantly maintained (the section A of FIG. 1), and then as the process proceeds, the pressure may be rapidly lowered (the section B of FIG. 1). However, if starting time point information and ending time point information for each of the section A and the section B of FIG. 1 are merely extracted as feature values, the section A of FIG. 1 may be restored only by the extracted information, but the section B may not be easily restored only by the extracted information because the section B does not have slope information.

Further, if an anomaly is detected based on a predetermined standard for all sections of the time series data, an error rate may increase in detecting an anomaly. For example, in the section A of FIG. 1, e.g., at the early stage when a high pressure is constantly maintained, if a sensed value is beyond a range of ±5%, the sensed value may be an anomaly. However, in the section B in which a pressure rapidly decreases, even if the pressure rapidly decreases by 10% or more, it may indicate that the process proceeds normally. Thus, for the time series data 100, if an abnormal section is determined based on a uniform standard, an error rate of determination may increase.

Therefore, a method according to an example embodiment of the present disclosure may segment time series data into one or more segments, and extract different feature values for each segment. For example, if the time series data 100 of FIG. 1 is received, a method according to an example embodiment of the present disclosure may segment sections included in the time series data 100 into a constant segment A where a value remains constant, a down-ramp segment B where a value plunges, a spike segment C, and the like. Here, the constant type, down-ramp type, and spike type may be preset segment types for the time series data 100. The preset segment types of a method according to an example embodiment of the present disclosure may further include a piecewise-constant type, an up-ramp type, and a steady-state type in addition to the constant type, the down-ramp type, and the spike type. Further, considering the convexity, the up- or down-ramp type may be further classified into an up-convex-ramp type or a down-convex-ramp type, an up-concave-ramp type or a down-concave-ramp type and the like. Meanwhile, the segment types are not limited thereto, but may vary depending on the time series data and system implementation.

A method according to an example embodiment of the present disclosure may segment the time series data 100 into segments, and then identify a feature group mapped to each segment type according to each segment type. Based on the identification results, a feature value of each segment may be extracted.

For example, a feature group mapped to the constant segment may be composed of a starting time point, an ending time point, and a segment maintaining time. Meanwhile, a feature group mapped to a spike type segment may be composed of kurtosis information and a maximum value. Thus, starting time point information and ending time point information may be extracted from the constant type segment, and information on kurtosis and maximum value information may be extracted from the spike type segment.

In other words, a method according to an example embodiment of the present disclosure may extract different feature values for each segment type, and thus, when detecting an anomaly of the time series data based on extracted feature values, may improve accuracy of detection. Further, instead of storing and managing entire time series data, the method may store and manage feature values extracted from each segment, and thus, may improve system efficiency.

Figure 2A:
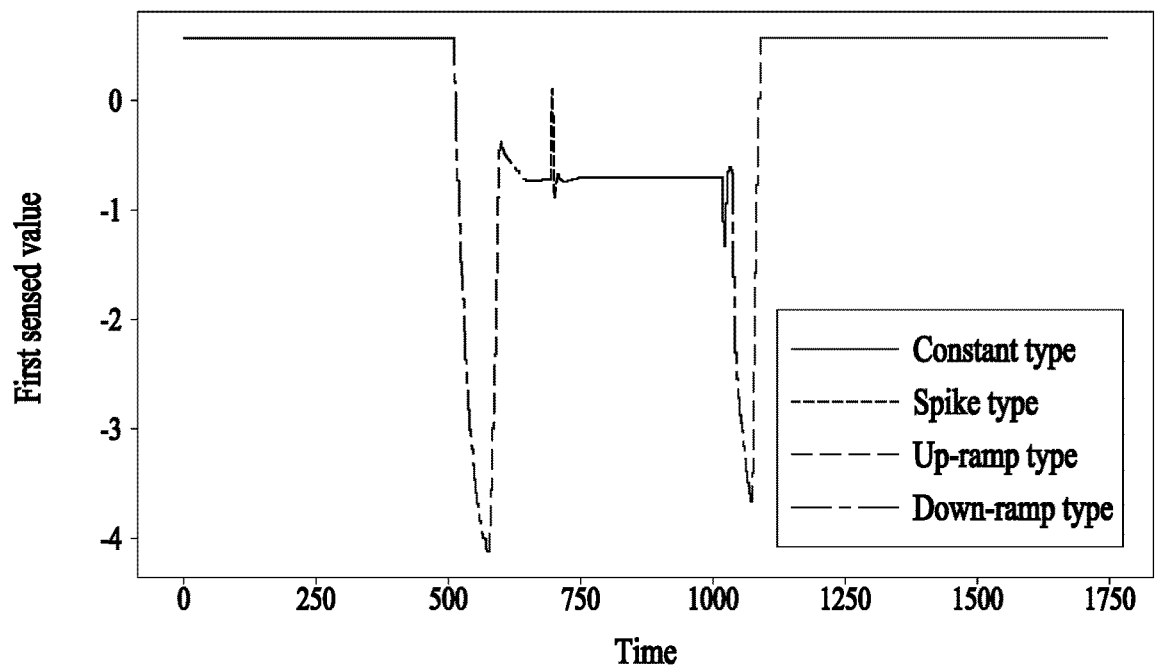
FIGS. 2A and 2B illustrate segmentation results of time series data according to an example embodiment of the present disclosure.
Figure 2B:
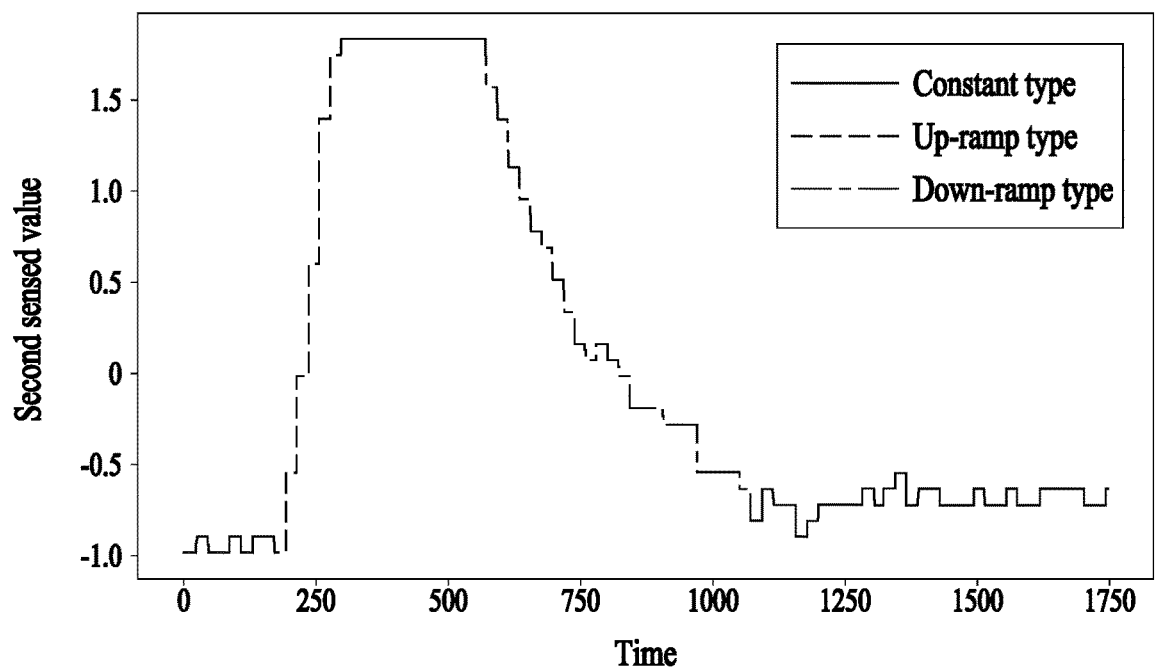

FIGS. 2A and 2B illustrate segmentation results of time series data according to an example embodiment of the present disclosure.

Referring to FIGS. 2A and 2B, a method of the present disclosure may segment different types of time series data into a plurality of segments according to preset segment types (a constant type, a spike type, an up-ramp type, and a down-ramp type). Here, the standards for determining segmentation of different types of time series data may vary.

For example, time series data illustrated in FIG. 2A may be time series data received from a pressure sensor of a specific process, and time series data illustrated in FIG. 2B may be time series data received from a temperature sensor of a specific process. Here, a standard for determining a constant type segment included in the time series data of FIG. 2A and a standard for determining a constant type segment included in the time series data of FIG. 2B may be different from each other.

FIG. 3 illustrates a feature group which may be mapped to each segment type according to an example embodiment of the present disclosure.

A method according to an example embodiment of the present disclosure may include a feature group mapped to a preset segment type. For example, a feature group mapped to a constant type segment may include a starting time point of the segment, an ending time point of the segment, and a segment maintaining time of the segment. Thus, in the case of the constant type segment, at least one of a starting time point, an ending time point, and a segment maintaining time of the segment may be extracted as a feature value from the segment.

Referring to FIG. 3, at least one of maximum value information, minimum value information, average information, standard deviation information, starting time point information, and ending time point information may be extracted as a feature value from a steady-state type segment. Meanwhile, as kurtosis information that may be extracted from a spike type segment, information necessary for specifying a shape of the spike such as a maximum value and a segment maintaining time of the spike type may be included.

However, the feature group mapped to each segment type is not limited to the disclosure of FIG. 3. In other words, even the constant type segment may include a maximum value item and a minimum value item in the feature group in some cases. Further, an item not provided in FIG. 3 may be included in the feature group of each segment type.

Figure 4:
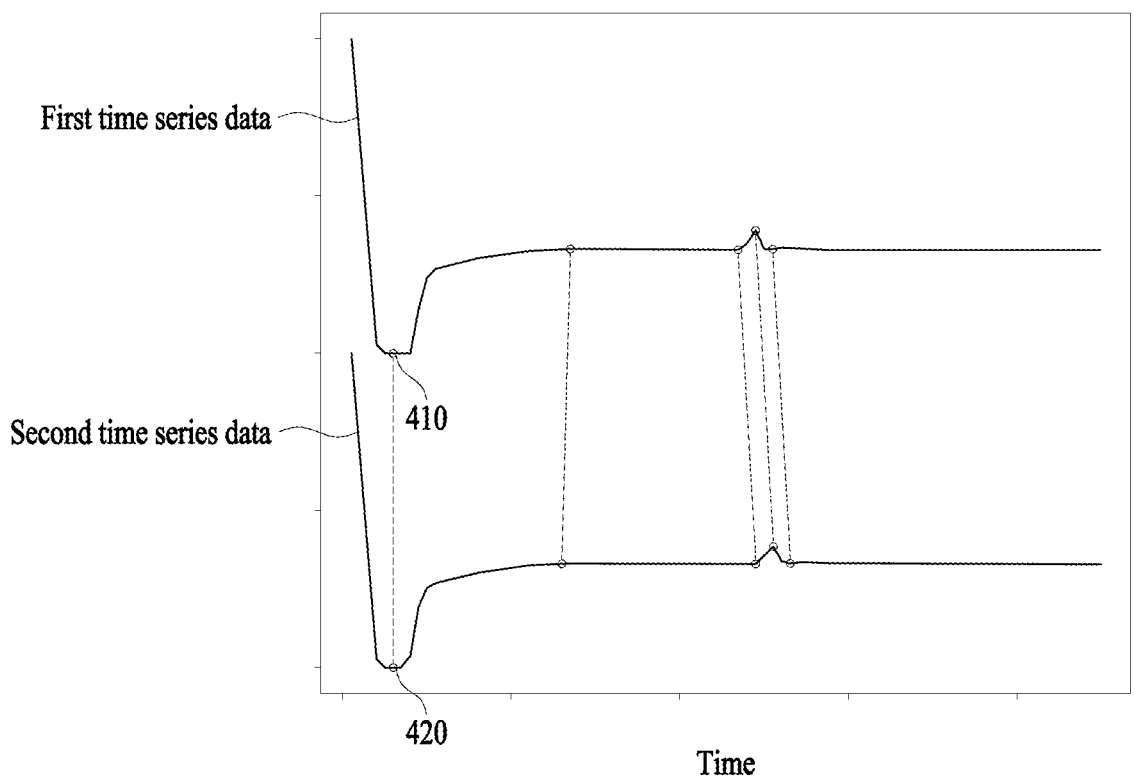
FIG. 4 shows an effect of a method according to an example embodiment of the present disclosure.

FIG. 4 shows an effect of a method according to an example embodiment of the present disclosure.

First time series data and second time series data of FIG. 4 may be the same type of time series data. For example, the first time series data of FIG. 4 may be data related to a valve position for controlling a pump intensity of a first cycle in a chamber during a semiconductor process, and the second time series data of FIG. 4 may be data related to a valve position for controlling a pump intensity of a second cycle. However, time shift issues may occur between the first time series data and the second time series data. For example, two time series data even for the same process may have different corresponding segment positions according to a sensing cycle of a sensor.

Therefore, if the first time series data and the second time series data are segmented merely according to a time section, an error rate may increase in detecting an anomaly of the time series data by comparing similar segments between the first time series data and the second time series data.

Meanwhile, a method of the present disclosure may segment and extract a feature value of each segment according to each segment type. Thus, although a minimum value 410 of the first time series data and a minimum value 420 of the second time series data of FIG. 4 are sensed at different times, feature values may be compared by synchronizing two segments, and thus, an accuracy of detecting an anomaly of time series data may be improved. Therefore, if time series data is a sensed value related to the environment of a specific process, the time series data may be segmented process by process according to segmentation results, and the segmentation results for each process may be robust to the time shift issues. In other words, in spite of the time shift issues, there may be merely few errors in the segmentation results for each process.

Figure 5A:
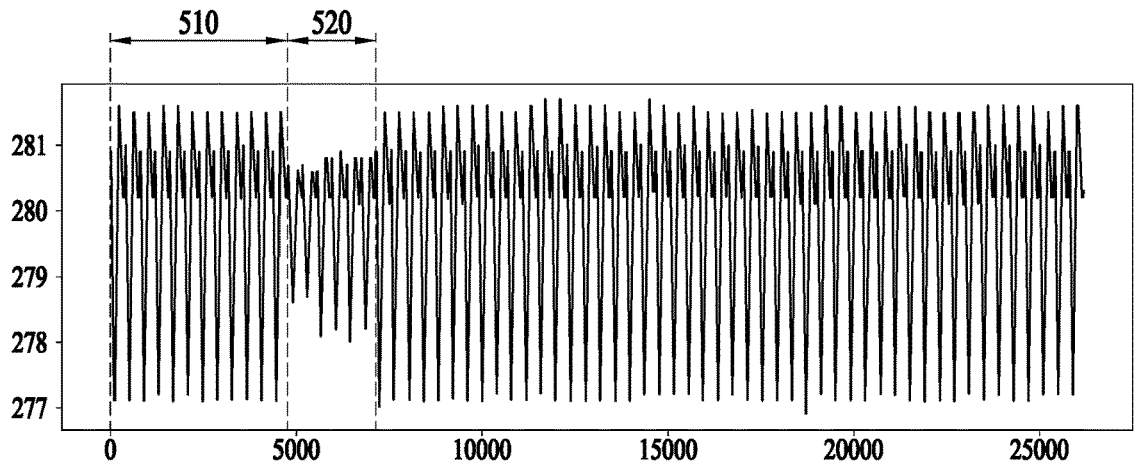
FIGS. 5A, 5B, and 5C show an effect of a method according to another example embodiment of the present disclosure.
Figure 5B:
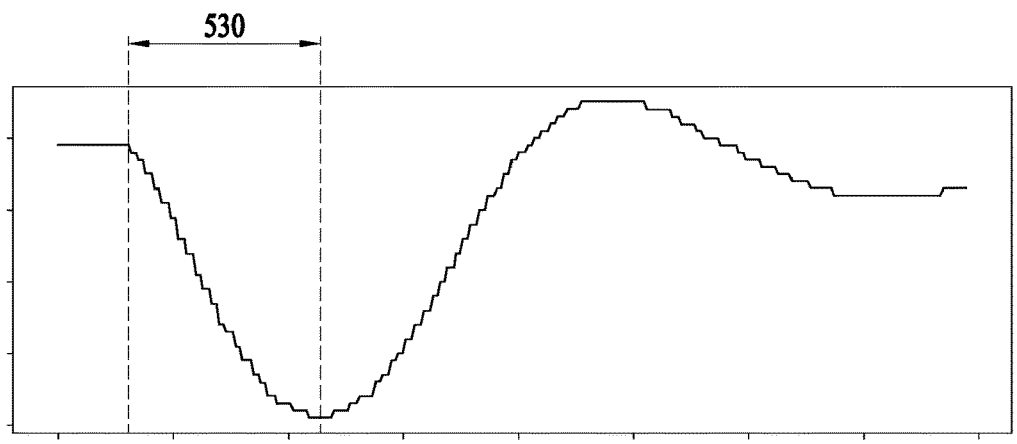
Figure 5C:
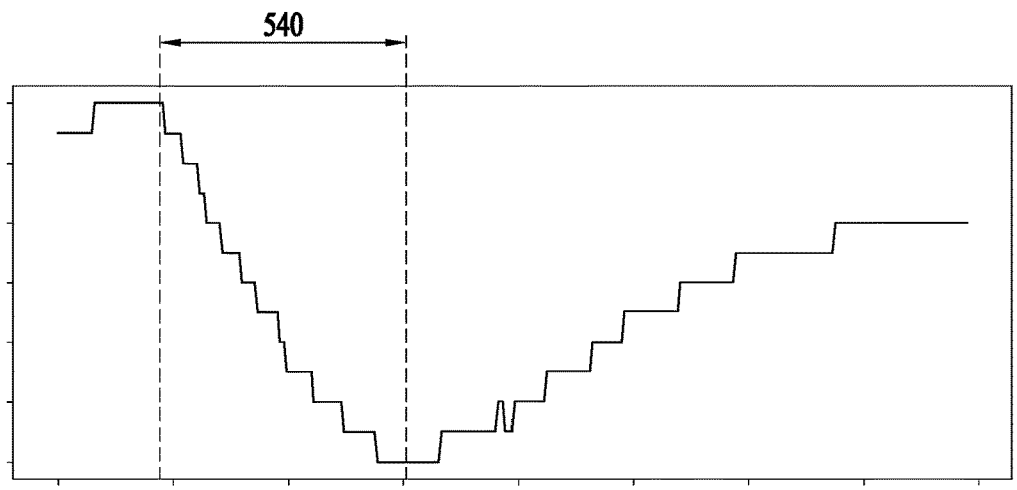

FIGS. 5A, 5B, and 5C show an effect of a method according to another example embodiment of the present disclosure.

A device for extracting a feature value of time series data according to an example embodiment may detect a segment having a different feature value among the same type of segments on the time series data, and determine whether the time series data has an anomaly based on the detection results.

FIG. 5B illustrates a segmentation result of one section included in a first section 510 of FIG. 5A, and FIG. 5C illustrates a segmentation result of one section included in a second section 520 of FIG. 5A. Referring to FIGS. 5B and 5C, it may be found that the segmentation results are different.

Further, FIGS. 5B and 5C both include a down-ramp type segment, an up-ramp type segment, and a constant type segment. When compared based on the down-ramp type segment, FIGS. 5B and 5C both include down-ramp type segments 530 and 540, but a feature value of the down-ramp type segment 530 included in FIG. 5B and a feature value of the down-ramp type segment 540 included in FIG. 5C are different from each other. Specifically, a slope, a maximum value, a minimum value, and the like of the down-ramp type segment 530 included in FIG. 5B are different from a slope, a maximum value, a minimum value, and the like of the down-ramp type segment 540 included in FIG. 5C. Therefore, a method of the present disclosure may detect an anomaly in one section of the time series data based on the feature values extracted from the segments.

Meanwhile, in order to detect an anomaly of time series data, the feature values extracted by a method according to an example embodiment of the present disclosure may be input to a machine-learning algorithm. The machine-learning algorithm may be trained with the input data, and after training, may detect an anomaly in the input time series data.

Figure 6A:
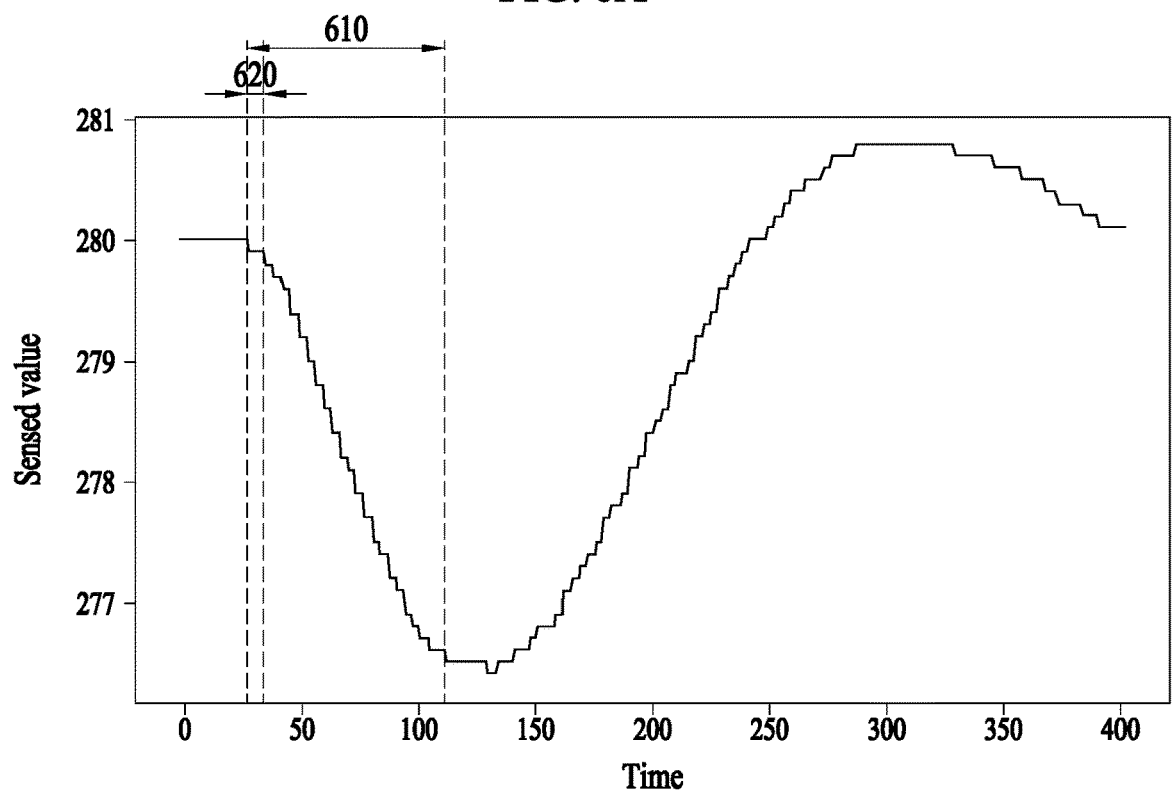
FIGS. 6A, 6B, and 7 illustrate a method of compressing time series data according to an example embodiment of the present disclosure.
Figure 6B:
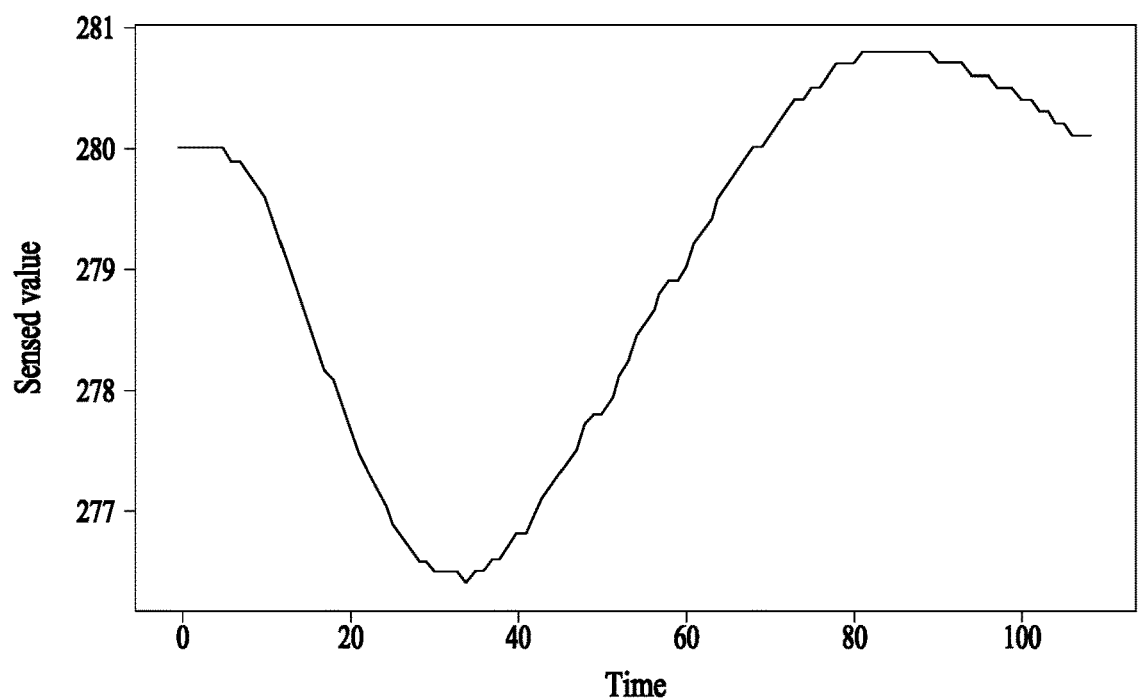
Figure 7:
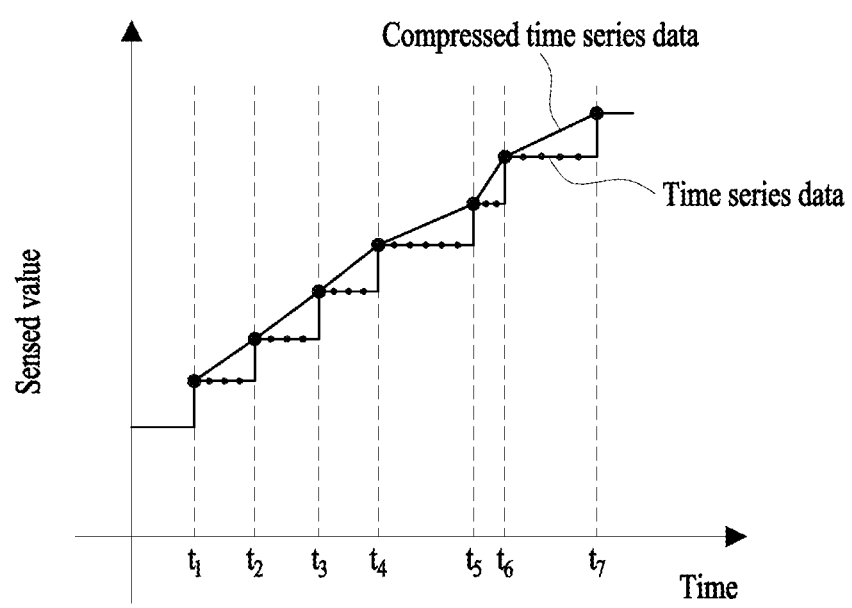

FIGS. 6A, 6B, and 7 illustrate a method of compressing time series data according to an example embodiment of the present disclosure.

A method for extracting a feature value of time series data according to an example embodiment may compress time series data. FIG. 6A illustrates time series data, and FIG. 6B illustrates a result of compressing the time series data of FIG. 6A.

Meanwhile, a down-ramp type or an up-ramp type of segment included in the time series data may include a stepwise ramp. Here, the stepwise ramp indicates a ramp section composed of a plurality of steps such as a first section 610 of FIG. 6A. For example, if a sensing cycle becomes longer, the time series data may show a more clear stepwise aspect.

However, if the stepwise ramp is included in the time series data, an error may occur in determining the segment type. For example, an entirety of the first section 610 of FIG. 6A should be completely identified as a segment of a down-ramp type, but a second section 620 may be segmented into a constant type segment because a predetermined value is maintained for a relatively long time in the second section 620 included in the first section 610.

Therefore, in order to resolve the issues, the method of the present disclosure may compress time series data, and then segment the time series data based on the compressed data. FIG. 6B shows that the up-ramp type of segment and the down-ramp type of segment included in the compressed data are composed of a curve ramp, instead of the stepwise ramp. Thus, segmentation on the compressed data may be easier, and the accuracy of the segmentation may be improved.

In order to reduce a loss rate of time series data, the method of the present disclosure, if a length of a first time section having a same value in the time series data is less than a first threshold value, may compress data of the first time section into data at a first time point included in the first time section. When compressing time series data in this way, time series data with one stepwise section may be transformed into time series data having a ramp due to data quantization.

Referring to FIG. 7, time series data may be compressed into values of time points at which a dramatic change happens ($t_1$ to $t_7$).

The compressed time series data may be represented with data of a shorter time compared to the previous time series data before compression according to a compression ratio. However, the compressed time series data of FIG. 7 is represented on an x-axis in an expanded form according to a compression ratio for comparison with the time series data before compression. Hereinafter, the compressed time series data of FIG. 7 will be described based on a premise that the data is in an expanded form.

The time series data of one section between $t_1$ and $t_2$ of FIG. 7 may be compressed into the data at $t_1$. Meanwhile, the compression of the time series data may be performed at an intermediate time point between consecutive two time points among time points $t_1$ to $t_7$ or at a different time point instead of at an individual time point of $t_1$ to $t_7$ at which time series data dramatically changes. For example, the time series data of one section between $t_1$ and $t_2$ of FIG. 7 may be compressed to be a median of $t_1$ and $t_2$ or the data of $t_2$.

If a segmentation is performed based on the compressed data, the method according to an example embodiment of the present disclosure may perform a post-processing for noise of both ends of a segment. For example, as a result of restoring a partial section segmented as a first segment on the compressed data, when it is appropriate to be determined as a segment ahead of the first segment, the section may be readjusted to be a segment previous to the first segment. As an example, if an area of the restored time series data, which should have been determined as a constant type of segment, is classified as an up-ramp type of segment next to the constant type segment, a method of the present disclosure may re-adjust the corresponding area to be a constant type of segment through a post-processing.

Here, the method according to an example embodiment of the present disclosure may post-process a segment based a slope of the restored time series data, but a standard for determining the post-processing is not limited to the slope.

Further, the method of the present disclosure may store time point information ($t_1$ to $t_7$), value information at each time point and interval information between consecutive two time points among time points ($t_1$ to $t_7$) to restore the compressed data later. Thus, the time series data may be restored based on the compressed data and the stored information without data loss or with a minimum data loss.

FIGS. 8, 9A, 9B, and 10 illustrate results of anomaly detection for time series data based on feature values extracted from the time series data according to an example embodiment.

Meanwhile, a method according to an example embodiment of the present disclosure may be used for analyzing time series data which may be generated during a sophisticated process of high-tech manufacturing business such as a semiconductor, a display, and a sunlight generation.

Specifically, a semiconductor process includes a pre-processing and a post-processing. The pre-processing may indicate a process of carving a circuit on a wafer to produce a chip, and the post-processing may indicate a process of cutting, packaging and testing a chip. The pre-processing may include processes such as oxidation, exposure, etching, cleaning, flattening, ion implantation, depositing and heat treatment.

However, since there were a limited number of time series data that may be used for detecting an anomaly during the process in the past, an accuracy of detecting an anomaly was low. For example, how much a wafer is bended could be determined only based on temperature data, and thus, the accuracy of detecting an anomaly of the process was low.

However, as an advanced technology leads to an entire process scaling and the amount of time series data collected for detecting an anomaly for each process increase, there is a need for a method for detecting an anomaly based on various time series data while monitoring a detailed process.

Meanwhile, a method according to an example embodiment of the present disclosure may, for example, detect a bending phenomenon of a wafer introduced to the semiconductor process, detect whether special gas for the semiconductor process leaks, or detect plasma used for a chemical vapor deposition method for producing a thin film of the wafer, or atomic layer etching and the like. In addition, the method is not limited to the above examples, but may be applied to all methods for detecting an anomaly based on time series data. If a method according to an example embodiment of the present disclosure is used, the machine-learning algorithm and various time series data may be used for detecting an anomaly, thereby improving the accuracy of anomaly detection.

Further, a method according to an example embodiment of the present disclosure may use time series data for a valve position along with time series data of various sensors in order to detect a leakage of special gas for production purpose within a vacuum chamber during the semiconductor process, thereby improving the accuracy for a gas leakage detection. In addition, a method according to an example embodiment of the present disclosure may be applied to detection of particles (dust, fine particles) during the semiconductor process.

Figure 8:
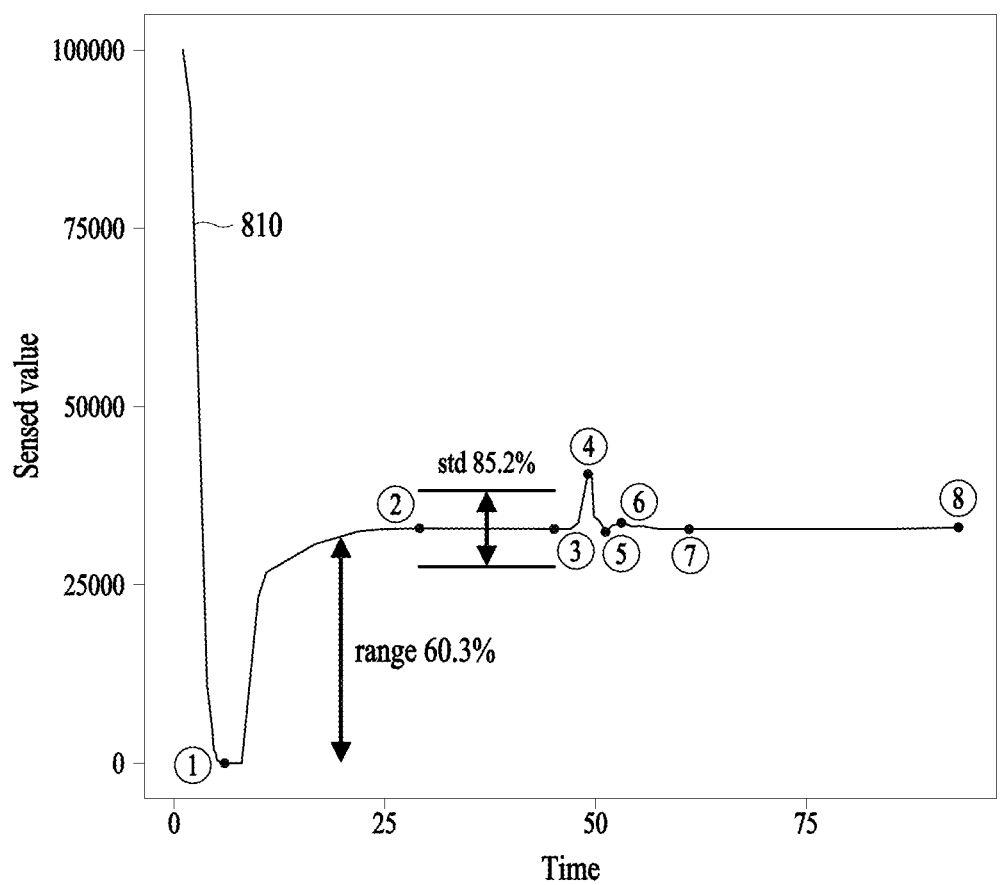
FIGS. 8, 9A, 9B, and 10 illustrate results of anomaly detection for time series data based on feature values extracted from the time series data according to an example embodiment.

FIG. 8 is a graph illustrating time series data for a valve position for controlling a pump intensity, sensed during the semiconductor process according to an example embodiment.

A process of lowing pressure in a chamber using a pump may be included in a semiconductor process. Here, an inside of the chamber should be in a vacuum state, but the inside of the chamber may fail to reach a vacuum state due to factors such as a broken rubber valve or a broken glass tube. A method according to an example embodiment of the present disclosure may detect an abnormal process, in which the inside of a chamber fails to reach a vacuum state, based on the time series data for the valve position for controlling the pump intensity.

Referring to FIG. 8, time series data 810 may be segmented into a first segment to an eighth segment. Specifically, the first segment may be a down ramp type segment, and a second segment may be an up ramp type segment. Further, a third segment may be a steady-state type segment, and the eighth segment may be a constant type segment.

Meanwhile, a method according to an example embodiment of the present disclosure may have different standards for determining an anomaly for each segment. Referring to FIG. 8, if a section between a minimum value and a maximum value of the second segment of the time series data obtained at a predetermined time point (e.g., a "range" feature value of a segment corresponding to a section between ① and ② of FIG. 8) is greater than a threshold value, a method according to an example embodiment of the present disclosure may identify that the product or the process related to the corresponding time series data may have a failure rate of 60.3%. Further, the third segment of the time series data obtained at a predetermined time point, which is not illustrated in FIG. 8, may fluctuate minutely, and thus, a standard deviation for a range of fluctuation may exist. Thus, if a standard deviation of the third segment (e.g., a "std" feature value of a segment corresponding to a section between ② and ③ of FIG. 8) is greater than a threshold value, it may be found that the product or the process related to the corresponding time series data may have a failure rate of 85.2%. Therefore, an anomaly of a process may be detected more accurately based on this statistical information.

Figure 9A:
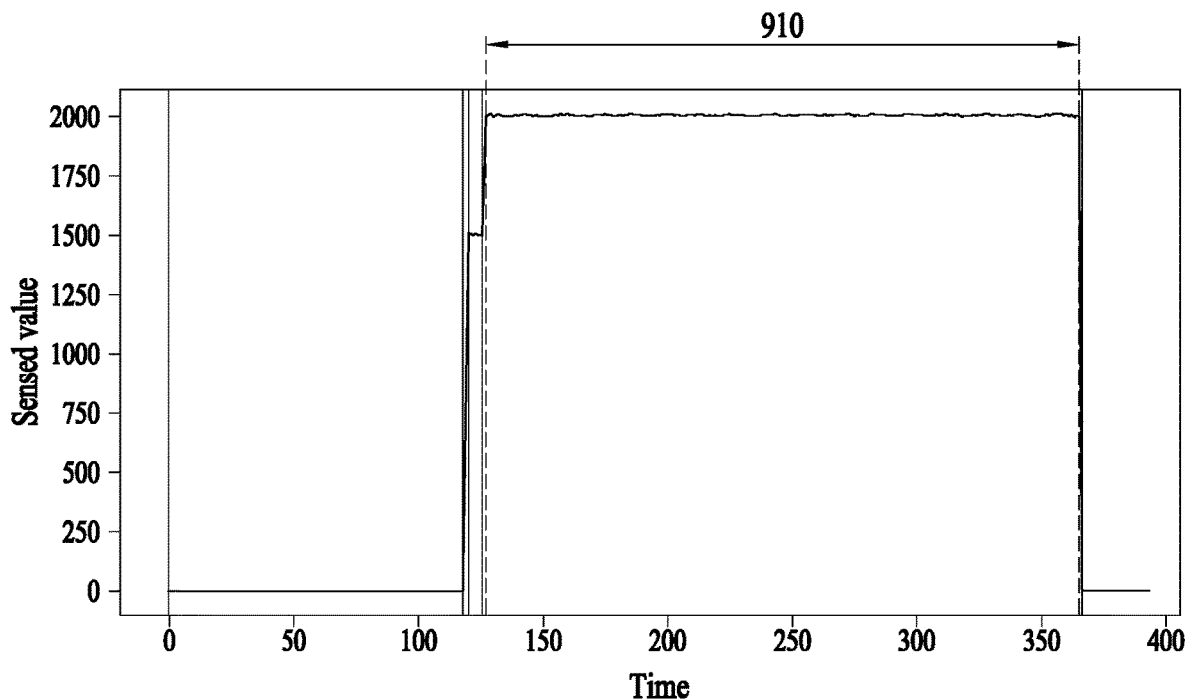
Figure 9B:
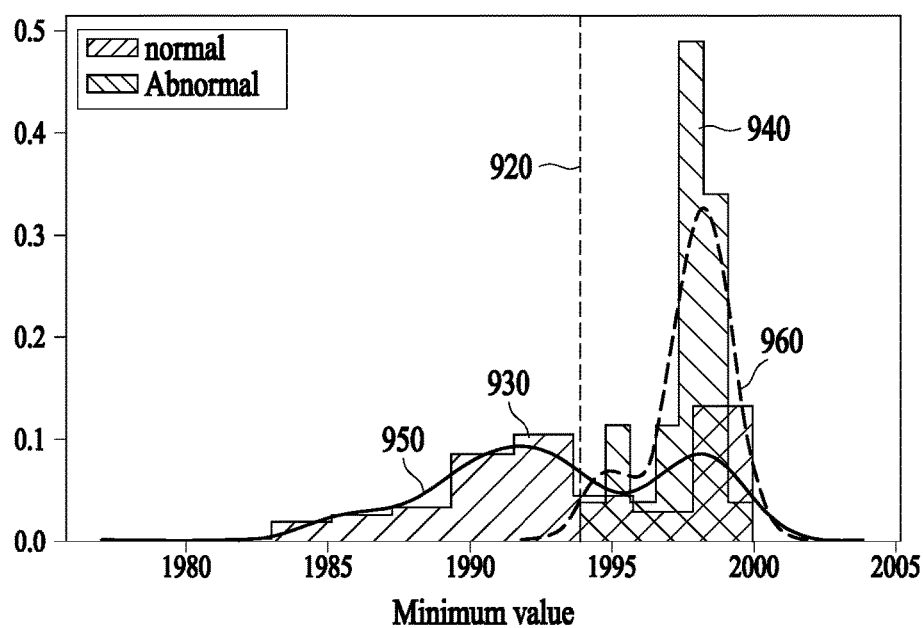

FIGS. 9A and 9B illustrate graphs representing time series data for a source power sensed during the semiconductor process.

FIG. 9A is a graph illustrating time series data for the source power in the semiconductor process, and FIG. 9B is a graph illustrating a distribution of the time series data detected as being normal or abnormal according to a minimum value of a first segment 910 of the time series data of FIG. 9A.

For example, if the time series data for the source power during the semiconductor process is collected 100 times, each first segment may be extracted from 100 time series data. Then, each minimum value may be derived from the extracted 100 first segments. The first segment 910 illustrated in FIG. 9A is illustrated as if it had constant values, but when magnified, shows different data being enumerated. Thus, the minimum values of the extracted 100 first segments may be distributed within a certain range (about 1980 to 2005) as illustrated in FIG. 9B.

On the other hand, in a bar graph illustrated in FIG. 9B based on real experimental results, an x value is a minimum value of the first segment 910 of each time series data, and a y value is a relative proportion at which the corresponding minimum value occurs. As an example, if 30 time series data of the 100 collected time series data are determined as data for a normal process, a first bar graph 930 may be derived according to a minimum value of the each first segment extracted from the 30 time series data. Further, if 70 time series data of the 100 collected time series data are determined as data for an abnormal process, a second bar graph 940 may be derived according to a minimum value of the each first segment extracted from the 70 time series data. Meanwhile, the values over the y-axis illustrated in FIG. 9B relate to a first curve graph 950, and a second curve graph 960, and the y values of the first bar graph 930 and the second bar graph 940 are not specified in FIG. 9B. As an example, when deriving the first bar graph 930 and the second bar graph 940 using 100 collected time series data, there may be, for example, 40 y values of the greatest bar of the second bar graph 930 and 8 y values of the greatest bar of the second bar graph 940.

Meanwhile, the first curve graph 950 indicates a probability density function of the first bar graph 930 along an x-axis, and the second curve graph 960 indicates a probability density function of the second bar graph 940 along an x-axis. Thus, the integrals of the two curve graphs are 1. As an example, every x value of the first curve graph 950 is included in a range from 1983 to 2003, and a sum of y values for every x value of the first curve graph 950 is 1. Further, every x value of the second curve graph 960 is included in a range from 1993 to 2003, and a sum of y values for every x value of the second curve graph 960 is 1.

The first bar graph 930, the second bar graph 940, the first curve graph 950 and the second curve graph 960 illustrated in FIG. 9B are illustrated as overlapped to one another for better understanding, and each graph should be analyzed separately although different graphs are illustrated as overlapped to one another.

Meanwhile, a correlation between time series data and an abnormal state incurred during a process may be analyzed using the method according to an example embodiment of the present disclosure. For example, to classify 100 items of collected time series data into data corresponding to a normal state and data corresponding to an abnormal state, complicated determination standards may have to be applied based on many variables or an algorithm requiring a long computing time may have to be used. In contrast, referring to FIG. 9B, it may be found that if a minimum value of the first segment 910 of FIG. 9A is equal to or greater than a first point 920, data for an abnormal state begin to be detected. Thus, instead of using the complicated determination standards to determine whether time series data is in a normal state or abnormal state, the method of the present disclosure may determine whether time series data is in a normal state based on a minimum value of the first segment. In this case, there is an effect of reducing a computing amount and time.

According to specific experimental results, if the minimum value of the first segment 910 of FIG. 9A is less than the first point 920, particles are not generated in 99.5% of all wafers. If the minimum value of the first segment 910 is equal to or greater than the first point 920, five or more particles are generated in 21.5% of all wafers. Thus, if a method according to an example embodiment of the present disclosure is used, a probability of generating five or more particles may be predicted based on a minimum value of a portion of a section of time series data for the source power.

Figure 10:
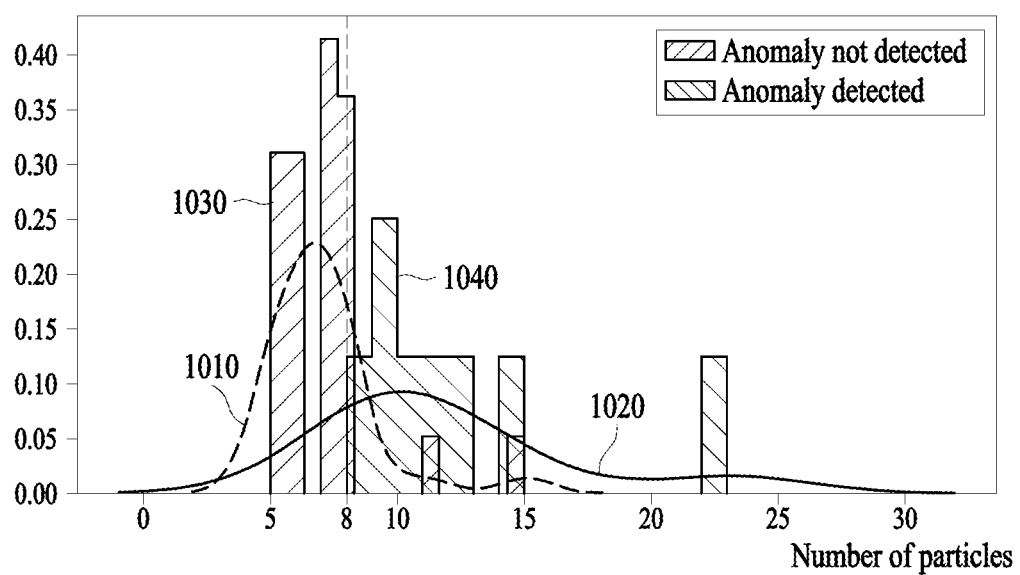

FIG. 10 is a graph illustrating experimental results related to a method according to an example embodiment of the present disclosure.

Specifically, FIG. 10 is a graph illustrating marathon data collected for verifying a mass production possibility of a semiconductor. Marathon data indicates data generated during a marathon test performed for verifying the mass production possibility. Among 3131 wafers, a particle inspection was performed for 404 wafers, and inter alia, 37 wafers had five or more particles, and 367 wafers did not have five or more particles. Generally, wafers with more particles are highly likely to have anomaly during a process. FIG. 10 is to illustrate a ratio of an anomaly detected or not detected according to a number of particles only for 404 time series data for which a particle inspection has been performed.

Meanwhile, a first bar graph 1030 illustrated in FIG. 10 is a bar graph related to an anomaly not detected, and a second bar graph 1040 is a bar graph related to an anomaly detected. In the first bar graph 1030 and the second bar graph 1040 based on real experimental results, an x value indicates a number of particles, and a y value indicates a relative proportion of the generated data in an abnormal state, detected or not detected, to time series data with the corresponding number of particles detected.

Meanwhile, a first curve graph 1010 indicates a probability density function of the first bar graph 1030 along an x-axis, and a second curve graph 1020 indicates a probability density function of the second bar graph 1040 along an x-axis. Thus, the integrals of two curve graphs are 1. As an example, every x value of the first curve graph 1010 is included in a range from 3 to 18, and a sum of y values for every x value of the first curve graph 1010 is 1. Further, every x value of the second curve graph 1020 is included in a range from 1 to 30, and a sum of y values for every x value of the second curve graph 1020 is 1. Meanwhile, y values of the first bar graph 1030 and the second bar graph 1040 are not specified in FIG. 10, and y-axis values illustrated in FIG. 10 relate to the first curve graph 1010 and the second curve graph 1020. As an example, referring to the first bar graph 1030, although the y values of the bar graph (e.g., the number of an anomaly not detected) are not specifically indicated, it may be found that a proportion of an anomaly not detected when there are 8 particles is less than a proportion of an anomaly not detected when there are 7 particles.

Meanwhile, the first bar graph 1030, the second bar graph 1040, the first curve graph 1010 and the second curve graph 1020 illustrated in FIG. 10 are illustrated as overlapped to one another for better understanding. Thus, each graph should be analyzed separately although different graphs are illustrated as overlapped to one another.

Meanwhile, a method according to an example embodiment of the present disclosure may detect an anomaly during a process by performing a machine-learning based on 45 different types of time series data. As a result of experiments, anomaly detection during a process according to a method according to an example embodiment of the present disclosure (e.g., detection of a wafer with particles occurred according to an algorithm of the present disclosure without a direct particle inspection) shows that 24 wafers were detected among 37 wafers with five or more particles occurred. Referring to FIG. 10, it may be found that a method according to an example embodiment of the present disclosure shows that the detecting performance for a wafer with 8 or more particles occurred is relatively higher than the detecting performance for a wafer with particles less than 8 occurred.

In other words, it may be found that a wafer with a great degree of anomaly, with 8 or more particles, is highly likely to be detected, but a wafer with particles less than 8 is less likely to be detected. However, in reality, a standard for determining the anomaly, e.g., the specific number of particles occurred from which a wafer is determined as having anomaly, may be ambiguous during anomaly detection. In this case, if there are specifically 8 particles, the corresponding wafer may be determined as having anomaly through the probability density function of FIG. 10.

Figure 11:
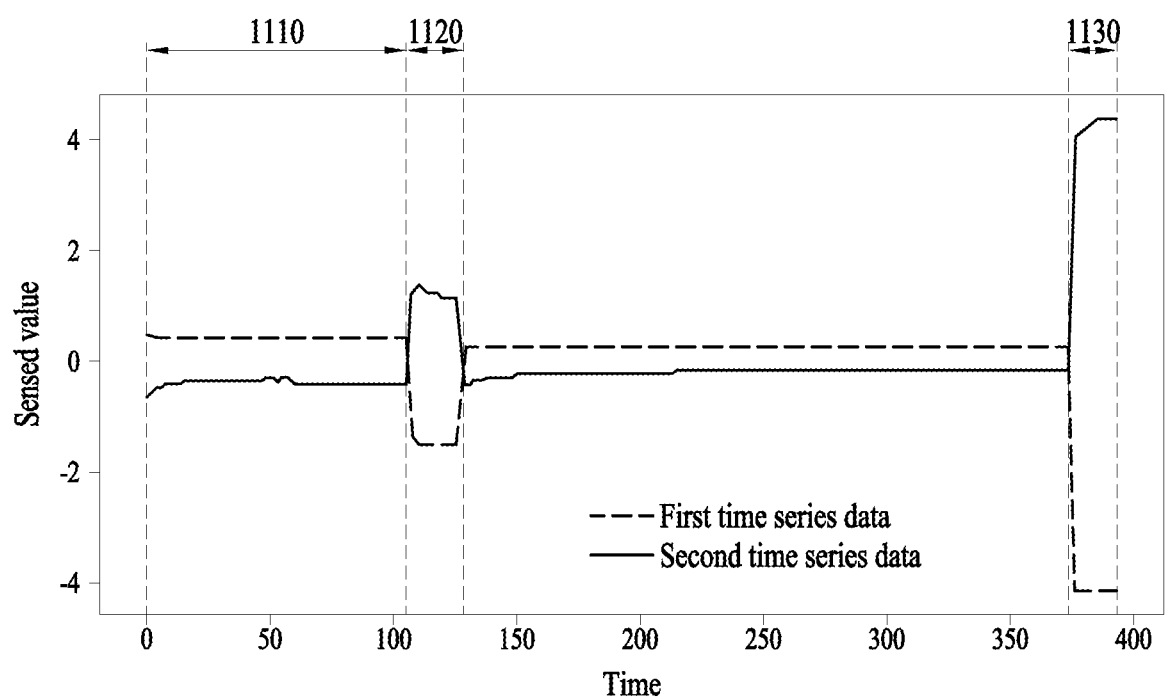
FIG. 11 shows segmentation results of two types of time series data according to an example embodiment of the present disclosure.

FIG. 11 indicates a result of segmentation of two types of time series data according to an example embodiment of the present disclosure.

Referring to FIG. 11, it may be found that most of sections of time series data are maintained at a constant value, and at some sections 1120 and 1130, first time series data and second time series data are transformed to have opposite aspects to each other. In this case, a section having opposite aspects of values is highly likely to be necessary for analyzing data in reality, and thus, such a section may be necessarily managed as an important section.

Accordingly, a method according to an example embodiment of the present disclosure may segment time series data into one or more segments, and then calculate a correlation between some segments and a segment of different time series data. As an example, referring to FIG. 11, a method according to an example embodiment of the present disclosure may easily calculate a correlation between a first segment of the first time series data and a second segment of the 16 second time series data of a first section 1120, instead of calculating a correlation between the first time series data and the second series data. In this case, since a correlation is zero at a section 1110, it becomes sophisticated to directly calculate a correlation between the first time series data and the second time series data. On the contrary, a correlation between segments may be calculated in a relatively easier way, which may provide an effect of efficiently calculating a correlation between the first time series data and the second time series data.

Figure 12:
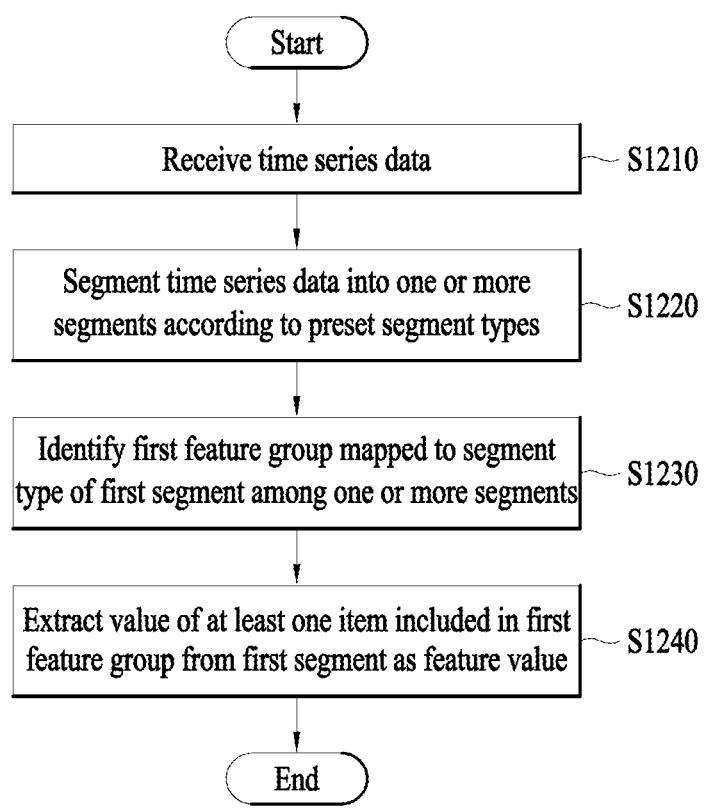
FIG. 12 is a flowchart illustrating a method for extracting a feature value of time series data according to an example embodiment of the present disclosure.

FIG. 12 is a flowchart illustrating a method for extracting a feature value of time series data according to an example embodiment.

In operation S1210, the method may receive time series data. Here, the time series data may be sensed data of a sensor, which may be generated during a specific process, for example, sensed data generated during a semiconductor process, but is not limited thereto.

In operation S1220, the method may segment time series data into one or more segments according to preset segment types. Here, the preset segment types may include at least one of a constant type, a spike type, a piecewise-constant type, a steady-state type, an up-ramp type, and a down-ramp type.

Meanwhile, if a length of a first time section having a same value in the time series data is less than a first threshold value, operation S1220 may include an operation of compressing data of the first time section into the data at a first time point included in the first time section.

Further, operation S1220 may further include an operation of determining, in the compressed data, a second time section as a segment of one of the preset segment types based on a slope of the second time section including the first time point. Here, operation S1220 may further include an operation of restoring the compressed data based on at least one of information on the first time point and information on the length of the first time section, and a second segment included in the restored data may correspond to the second time section of the compressed data.

Operation S1220 may further include an operation of adjusting a section of the second segment based on a slope of the second segment.

And if a number of the segments is less than a second threshold value, operation S1220 may further include an operation of adjusting a compression ratio of one or more segments included in the compressed data.

In operation S1230, the method may identify a first feature group mapped to a segment type of a first segment among the one or more segments.

In operation S1240, the method may extract a value of at least one item included in the first feature group from the first segment as a feature value.

Meanwhile, items included in the first feature group may include at least one of a slope, a starting time point, an ending time point, a length, a standard deviation, a maximum value, a minimum value, a convexity, a residual, a kurtosis, a skewness, an amplitude, and a frequency, of a segment.

The method of the present disclosure may further include an operation of detecting an anomaly of the time series data based on the extracted feature values. Here, the operation of detecting an anomaly of the time series data may include an operation of detecting an anomaly of the time series data based on a correlation between the extracted feature value and a feature value extracted from time series data different from the time series data.

Meanwhile, the segment type and a standard for determining the segment type may be determined by a type of the time series data.

Figure 13:
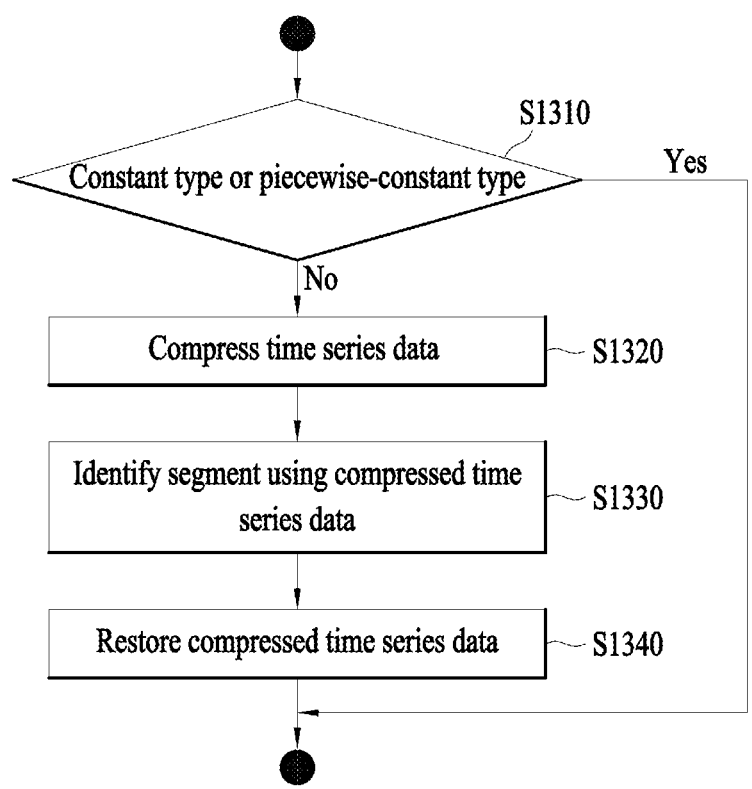
FIG. 13 is a flowchart illustrating a method for extracting a feature value of time series data according to another example embodiment of the present disclosure.

FIG. 13 is a flowchart illustrating a method for extracting a feature value of time series data according to another example embodiment of the present disclosure.

In operation S1310, the method may determine whether the first section included in the received time series data is a constant type segment or a piecewise-constant type segment. For example, if one section included in the time series data entirely has a same value or has 5 or less unique values, a method of the present disclosure may segment the corresponding section into a constant type segment or a piecewise-constant type segment. Meanwhile, it is obvious to those skilled in the art that a standard for determining the constant type or piecewise-constant type segment is not limited thereto and may vary depending on time series data and system implementation conditions.

If, in operation S1310, the first section included in the time series data is a constant type segment or a piecewise-constant type segment, the method of the present disclosure may perform operation S1230 of FIG. 12, or if not, perform operation S1320.

In operation S1320, the method may compress time series data. Here, a method of compressing time series data may be the same as the method described with reference to FIGS. 6 and 7.

In operation S1330, the method may identify segments using the compressed time series data. In other words, in operation S1330, whether a portion of the compressed time series data corresponds to one of the preset segment types such as a spike type, a steady-state type, an up-ramp type and a down-ramp type may be determined. In the case of a constant type and piecewise-constant type segments, the segments are determined in operation S1310, and thus, segments other than the constant and piecewise-constant type segments may be identified in operation S1330.

Meanwhile, although FIG. 13 illustrates that the constant type and piecewise-constant type segments are determined prior to compressing time series data, it is obvious to those skilled in the art that operation S1310 may be omitted and the constant type and piecewise-constant type segments may be identified using the compressed time series data in operation S1330.

In operation S1340, the method may restore the compressed time series data. Specifically, the method may restore the compressed time series data based on information on a starting time point, information on an ending time point and value information of the compressed section stored when compressing the time series data. Thus, a data loss rate may be reduced compared to a case of restoring the compressed time series data based on an interpolation.

Figure 14:
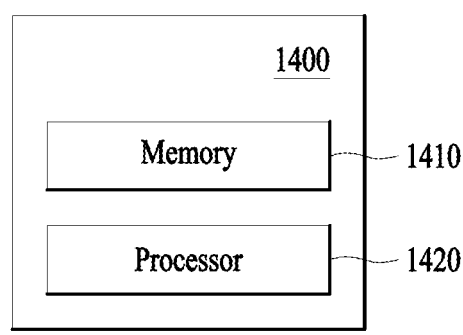
FIG. 14 is a block diagram illustrating a device for extracting a feature value of time series data according to an example embodiment of the present disclosure.

FIG. 14 is a block diagram illustrating a device for extracting a feature value of time series data according to an example embodiment.

A device 1400 for extracting a feature value of time series data may include a memory 1410 and a processor 1420 according to an example embodiment. The device 1400 for extracting a feature value of time series data illustrated in FIG. 14 is depicted to have only components related to the present example embodiment. Thus, those skilled in the related art to the present example embodiment may understand that the device may further include universal components other than the components illustrated in FIG. 14.

The memory 1410 is a hardware storing every kind of data processed within the device 1400 for extracting a feature value of time series data. As an example, the memory 1410 may store data processed and to be processed in the device 1400 for extracting a feature value of time series data. The memory 1410 may store at least one instruction for an operation of the processor 1420. Further, the memory 1410 may store a program or an application which may be operated by the device 1400 for extracting a feature value of time series data. The memory 1410 may include a random access memory (RAM) such as a dynamic random access memory (DRAM) and a static random access memory (SRAM), a read-only memory (ROM), an electrically erasable programmable read-only memory (EEPROM), CD-ROM, Blu-ray or other optical disk storage, a hard disk drive (HDD), a solid state drive (SSD), or a flash memory.

The processor 1420 may control entire operations of the device 1400 for extracting a feature value of time series data, and may process data and signals. The processor 1420 may entirely control the device 1400 for extracting a feature value of time series data by executing at least one instruction or at least one program stored in the memory 1410. The processor 1420 may be implemented by a central processing unit (CPU), a graphics processing unit (GPU), an application processor (AP) and the like, but not be limited thereto.

The processor 1420 may receive time series data, segment the time series data into one or more segments according to preset segment types, identify a first feature group mapped to a segment type of a first segment among the one or more segments, and extract a value of at least one item included in the first feature group from the first segment as a feature value.

Meanwhile, when segmenting time series data into one or more segments, the processor 1420 may compress data of the first time section into the data at a first time point included in the first time section if a length of the first time section having a same value in the time series data is less than a first threshold value. Further, the processor 1420 may determine, in the compressed data, a second time section as a segment of one of the preset segment types based on a slope of the second time section including the first time point.

Later, the processor 1420 may restore the compressed data based on at least one of information on the first time point and information on the length of the first time section. Here, a second segment included in the restored data may correspond to the second time section of the compressed data. Further, the processor 1420 may adjust a section of the second segment based on a slope of the second segment.

Meanwhile, if a number of the segments is less than a second threshold value, the processor 1420 may adjust a compression ratio of one or more segments included in the compressed data.

Meanwhile, items included in the first feature group may include at least one of a slope, a starting time point, an ending time point, a length, a standard deviation, a maximum value, a minimum value, a convexity, a residual, a kurtosis, a skewness, an amplitude, and a frequency, of a segment.

Further, the processor 1420 may detect an anomaly of time series data based on the extracted feature values. To this end, the processor 1420 may use a machine-learning algorithm. Moreover, the processor 1420 may predict future time series data based on the feature values extracted using RNN and LSTM deep-learning technologies.

Further, the processor 1420 may detect an anomaly of time series data based on a correlation between the extracted feature value and a feature value extracted from time series data different from the time series data.

The preset segment types may include at least one of a constant type, a spike type, a piecewise-constant type, a steady-state type, an up-ramp type and a down-ramp type.

Further, the segment type and a standard for determining the segment type may be determined by a type of the time series data. As an example, the segment type of the time series data received from a pressure sensor may include a constant type, a piecewise-constant type, an up-ramp type and a down-ramp type, and the segment type of the time series data received from a temperature sensor may further include a spike type. Further, standards for determining a constant type segment for the time series data received from the pressure sensor and the time series data received from the temperature sensor may be different from each other.

The processor according to the above-described example embodiments may include user interface devices such as a processor, a memory for storing and executing program data, a permanent storage such as a disk drive, a communication port for communicating with an external device, a touch panel, a key and a button. Methods implemented as software modules or algorithms may be computer-readable codes or program instructions executable on the processor and may be stored on a computer-readable recording medium. Here, the computer-readable recording medium includes a magnetic storage medium (for example, a read-only memory (ROM), a random-access memory (RAM), a floppy disk, and a hard disk) and an optically readable medium (for example, a compact disc (CD-ROM) and a digital versatile disc (DVD). The computer-readable recording medium may be distributed in computer systems connected through a network so that the computer-readable code may be stored and executed in a distributed manner. The computer-readable recording medium may be readable by a computer, and the computer-readable code may be stored in the memory and be executed on the processor.

The example embodiments may be implemented by functional block components and various processing operations. These functional blocks may be implemented in any number of hardware and/or software configurations which perform specific functions. For example, the example embodiments may employ integrated circuit components, such as a memory, processing, a logic, a look-up table, and the like, capable of executing various functions under the control of one or more microprocessors or by other control devices. Similar to that components may be implemented as software programming or software components, the example embodiments may include various algorithms implemented as data structures, processes, routines, or a combination of other programming components and may be implemented in a programming or scripting language such as C, C++, Java, assembler, or the like. The functional aspects may be implemented as algorithms executed on one or more processors. In addition, the example embodiments may employ the related art for an electronic environment setting, signal processing, and/or data processing. The terms such as a "mechanism," an "element," a "part," and a "component" may be used broadly and may be not limited to mechanical and physical components. These terms may include the meaning of a series of routines of software in association with a processor or the like.

The above-described example embodiments are merely examples, and other embodiments may be implemented within the scope of the appended claims which will be described below.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for extracting a feature value of time series data performed by a feature value extraction device of time series data, the method comprising:
   acquiring, by the feature value extraction device, first time series data for a process in a semiconductor process;
   segmenting, by the feature value extraction device, the first time series data into one or more segments according to preset segment types;
   if a length of a first time section having a same value in the first time series data is less than a first threshold value:
       compressing data of the first time section into data at a first time point included in the first time section; and
       determining, in the compressed data, a second time section as a segment of one of the preset segment types based on a slope of the second time section including the first time point;
   identifying, by the feature value extraction device, a first feature group of a plurality of preset feature groups mapped to a segment type of a first segment among the one or more segments;
   extracting, by the feature value extraction device, a value of at least one item included in the first feature group as a first feature value of the first segment;
   acquiring, by the feature value extraction device, a second time series data for said process in the semiconductor process, which is different from the first time series data;
   synchronizing, to account for a time shift between the first time series data and the second time series data and by the feature value extraction device, the first segment of the first time series data and a second segment among one or more segments of the second time series data;

extracting, by the feature value extraction device, a value of the at least one item included in the first feature group as a second feature value of the second segment;

managing, by the feature value extraction device, the first feature value corresponding to the first segment and the second feature value corresponding to the second segment; and determining, by the feature value extraction device, an anomaly in the semiconductor process corresponding to the second time series data based on the comparison of the first feature value and the second feature value.

2. The method of claim 1, further comprising restoring the compressed data based on at least one of information on the first time point and information on the length of the first time section, wherein a second segment included in the restored data corresponds to the second time section of the compressed data.

3. The method of claim 2, further comprising:

adjusting a section of the second segment based on at least one of a second feature group mapped to a segment type of the second segment.

4. The method of claim 3, further comprising:

adjusting the section of the second segment based on a slope of the second segment.

5. The method of claim 1, further comprising:

if a number of the segmented segments is less than a second threshold value, adjusting a compression ratio of one or more segments included in the compressed data.

6. The method of claim 1, wherein items included in the first feature group include at least one of a slope, a starting time point, an ending time point, a length, a standard deviation, a maximum value, a minimum value, a convexity, a residual, a kurtosis, a skewness, an amplitude, and a frequency, of a segment.

7. The method of claim 1, wherein the preset segment types comprise at least one of a constant type, a spike type, a piecewise-constant type, a steady-state type, an up-ramp type, and a down-ramp type.

8. The method of claim 1, wherein the segment type and a standard for determining the segment type are determined according to a type of the first time series data.

9. A device for extracting a feature value of time series data, the device comprising:

a memory configured to store at least one instruction; and a processor, wherein the processor, by executing the at least one instruction, is configured to:

acquire first time series data for a process in a semiconductor process;

segment the first time series data into one or more segments according to preset segment types;

if a length of a first time section having a same value in the first time series data is less than a first threshold value:

compress data of the first time section into data at a first time point included in the first time section; and determine, in the compressed data, a second time section as a segment of one of the preset segment types based on a slope of the second time section including the first time point;

identify a first feature group of a plurality of preset feature groups mapped to a segment type of a first segment among the one or more segments;

extract a value of at least one item included in the first feature group as a first feature value of the first segment;

acquire a second time series data for said process in the semiconductor process, which is different from the first time series data;

synchronize, to account for a time shift between the first time series data and the second time series data, the first segment of the first time series data and a second segment among one or more segments of the second time series data;

extract a value of the at least one item included in the first feature group as a second feature value of the second segment;

manage the first feature value corresponding to the first segment and the second feature value corresponding to the second segment; and determine an anomaly in the semiconductor process corresponding to the second time series data based on the comparison of the first feature value and the second feature value.

10. The device of claim 9, wherein the processor is further configured to: restore the compressed data based on at least one of information on the first time point and information on the length of the first time section, wherein a second segment included in the restored data corresponds to the second time section of the compressed data.

11. The device of claim 10, wherein the processor is further configured to:

adjust a section of the second segment based on at least one of a second feature group mapped to a segment type of the second segment.

12. The device of claim 11, wherein the processor is further configured to:

adjust the section of the second segment based on a slope of the second segment.

13. The device of claim 9, wherein the processor is further configured to:

if a number of the segmented segments is less than a second threshold value, adjust a compression ratio of one or more segments included in the compressed data.

14. The device of claim 9, wherein items included in the first feature group include at least one of a slope, a starting time point, an ending time point, a length, a standard deviation, a maximum value, a minimum value, a convexity, a residual, a kurtosis, a skewness, an amplitude, and a frequency, of a segment.

15. A non-transitory computer-readable recording medium in which a program to execute a method for extracting a feature value of time series data in a computer is recorded, the method comprising:

acquiring first time series data for a process in a semiconductor process;

segmenting the first time series data into one or more segments according to preset segment types;

if a length of a first time section having a same value in the first time series data is less than a first threshold value:

compressing data of the first time section into data at a first time point included in the first time section; and determining, in the compressed data, a second time section as a segment of one of the preset segment types based on a slope of the second time section including the first time point;

identifying a first feature group of a plurality of preset feature groups mapped to a segment type of a first segment among the one or more segments;

extracting a value of at least one item included in the first feature group as a first feature value of the first segment;

acquiring a second time series data for said process in the semiconductor process, which is different from the first time series data;

synchronizing, to account for a time shift between the first time series data and the second time series data, the first segment of the first time series data and a second segment among one or more segments of the second time series data;

extracting a value of the at least one item included in the first feature group as a second feature value of the second segment;

managing the first feature value corresponding to the first segment and the second feature value corresponding to the second segment; and determining an anomaly in the semiconductor process corresponding to the second time series data based on the comparison of the first feature value and the second feature value.

16. The non-transitory computer-readable recording medium of claim 15, the method further comprising restoring the compressed data based on at least one of information on the first time point and information on the length of the first time section, wherein a second segment included in the restored data corresponds to the second time section of the compressed data.

17. The non-transitory computer-readable recording medium of claim 16, the method further comprising:
adjusting a section of the second segment based on at least one of a second feature group mapped to a segment type of the second segment.

18. The non-transitory computer-readable recording medium of claim 17, the method further comprising:
adjusting the section of the second segment based on a slope of the second segment.

19. The non-transitory computer-readable recording medium of claim 15, the method further comprising:
if a number of the segmented segments is less than a second threshold value, adjusting a compression ratio of one or more segments included in the compressed data.

20. The non-transitory computer-readable recording medium of claim 15, wherein items included in the first feature group include at least one of a slope, a starting time point, an ending time point, a length, a standard deviation, a maximum value, a minimum value, a convexity, a residual, a kurtosis, a skewness, an amplitude, and a frequency, of a segment.

* * * * *